(12) United States Patent
Goellner et al.

(10) Patent No.: US 8,851,520 B2
(45) Date of Patent: Oct. 7, 2014

(54) FRONT SUBFRAME FOR A NARROW OFFSET COLLISION

(71) Applicant: Honda Motor Co., Ltd., Tokyo (JP)

(72) Inventors: Adam Corley Goellner, Marysville, OH (US); Stephen G. Rosepiler, Marysville, OH (US); Naoki Munekata, Dublin, OH (US); Grant G. Foreman, Bellefontaine, OH (US); Eric M. Heitkamp, Dublin, OH (US); Ryan A. Miller, Columbus, OH (US); Rajendra Kakarla, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/058,375

(22) Filed: Oct. 21, 2013

(65) Prior Publication Data

US 2014/0110925 A1    Apr. 24, 2014

Related U.S. Application Data

(60) Provisional application No. 61/716,805, filed on Oct. 22, 2012.

(51) Int. Cl.
*B62D 7/22* (2006.01)
*B62D 21/15* (2006.01)
*B62D 21/11* (2006.01)

(52) U.S. Cl.
CPC ............. *B62D 21/155* (2013.01); *B62D 21/11* (2013.01)
USPC ................... 280/784; 296/187.1; 296/187.09; 296/193.09

(58) Field of Classification Search
USPC .............. 280/784; 296/187.1, 187.09, 193.09
See application file for complete search history.

(56) References Cited

U.S. PATENT DOCUMENTS

| | | | |
|---|---|---|---|
| 1,481,572 A | 1/1924 | Tripp | |
| 2,901,266 A | 8/1959 | Lindsay | |
| 5,611,568 A * | 3/1997 | Masuda | 280/784 |
| 5,862,877 A * | 1/1999 | Horton et al. | 180/312 |
| 6,338,510 B1 | 1/2002 | Kanamori et al. | |
| 6,893,078 B2 | 5/2005 | Saeki | |
| 6,957,846 B2 * | 10/2005 | Saeki | 296/187.1 |
| 7,008,007 B2 | 3/2006 | Makita et al. | |
| 7,213,873 B2 * | 5/2007 | Murata et al. | 296/204 |
| 7,380,829 B2 * | 6/2008 | Kishima | 280/781 |
| 7,819,218 B2 | 10/2010 | Eichberger et al. | |

(Continued)

OTHER PUBLICATIONS

International Search Report and Written Opinion of PCT/US2013/065990 dated Mar. 19, 2013.

*Primary Examiner* — Toan To
(74) *Attorney, Agent, or Firm* — Rankin, Hill & Clark LLP (57) ABSTRACT

A front subframe for a vehicle body structure includes left and right longitudinal members which extend in a longitudinal direction of the vehicle body. A front cross member extends in a transverse direction of the body so as to extend between front ends of these longitudinal members. A rear cross member extends in the transverse direction of the body so as to extend between rear ends of the left and right longitudinal members. An engagement member as part of the front subframe is provided at each front end of the left and right longitudinal members. The engagement member is adapted to be engaged by an associated object during a narrow offset frontal collision and direct crash forces into the front subframe and vehicle body structure.

19 Claims, 11 Drawing Sheets

(56) References Cited

U.S. PATENT DOCUMENTS

| | | |
|---|---|---|
| 7,900,995 B2 | 3/2011 | Sato et al. |
| 8,152,211 B2 | 4/2012 | Klimek |
| 8,172,286 B2 | 5/2012 | Klimek |
| 8,490,988 B2 * | 7/2013 | Takeshita et al. ...... 280/124.109 |
| 8,596,711 B2 * | 12/2013 | Yasui et al. .............. 296/187.09 |
| 2004/0100127 A1 * | 5/2004 | Saitou ...................... 296/203.02 |
| 2004/0195862 A1 * | 10/2004 | Saeki ....................... 296/187.09 |
| 2009/0140546 A1 * | 6/2009 | Okabe et al. ............. 296/187.09 |
| 2011/0095568 A1 | 4/2011 | Terada et al. |
| 2012/0175899 A1 | 7/2012 | Gadhiya et al. |
| 2012/0248820 A1 | 10/2012 | Yasui et al. |

* cited by examiner

FRONT SUBFRAME FOR A NARROW OFFSET COLLISION

The present application claims priority to U.S. Prov. Patent App. Ser. No. 61/716,805 filed on Oct. 22, 2012, the disclosure of which is incorporated herein in its entirety.

BACKGROUND

Exemplary embodiments herein generally relate to a chassis or front subframe for a vehicle body structure, and more particularly, to a front subframe adapted for a small overlap or narrow offset frontal collision.

Current standard frontal crash tests include full frontal or moderate overlap frontal (e.g., 40% offset). Frontal impacts with less than 40% offset and corner impacts have previously received little attention. The small overlap or narrow offset frontal crash test is a newly emerging crash requirement associated with frontal impacts with less than 40% offset and corner impacts. The test is designed to replicate what happens when the front corner of a vehicle collides with another vehicle or an object like a tree or utility pole.

Most vehicles have safety cages encapsulating the occupant compartment and built to withstand head-on collisions and moderate overlap frontal crashes with little deformation. At the same time, crush zones help manage crash energy to reduce forces on the occupant compartment. The main crush-zone structures are typically concentrated in the middle 50% percent of the front end. When a crash involves these structures, the occupant compartment is protected from intrusion, and front airbags and safety belts restrain and protect occupants. The small overlap frontal crashes primarily affect a vehicle's outer edges, which generally are not well protected by the crush-zone structures. As such, crash forces can go directly into the front wheel, suspension system and firewall. To provide effective protection in small overlap crashes, the vehicle body structure needs to resist crash forces that are not tempered by crush-zone structures.

BRIEF DESCRIPTION

In accordance with the present disclosure, a front subframe for a vehicle body structure includes left and right longitudinal members which extend in a longitudinal direction of the vehicle body. A front cross member extends in a transverse direction of the body so as to extend between front ends of these longitudinal members. A rear cross member extends in the transverse direction of the body so as to extend between rear ends of the left and right longitudinal members. An engagement member as part of the front subframe is provided at each front end of the left and right longitudinal members. The engagement member is adapted to be engaged by an associated object during a narrow offset frontal collision and direct crash forces into the front subframe and vehicle body structure.

In accordance with one aspect, a front subframe for a vehicle body comprises left and right longitudinal members which extend in a longitudinal direction of a vehicle body. A front cross member extends in a transverse direction of the vehicle body so as to extend between front ends of the respective left and right longitudinal members. A rear cross member extends in the transverse direction of the vehicle body so as to extend between rear ends of the respective left and right longitudinal members. A left engagement member as part of the front subframe is fixedly provided at the front end of the left longitudinal member and a right engagement member as part of the front subframe is fixedly provided at the front end of the right longitudinal member. Each of the left and right engagement members extends laterally outwardly in the transverse direction beyond an outer lateral side of each of the respective left and right longitudinal members. Each engagement member is adapted to be engaged by an associated object during a narrow offset frontal collision and direct crash forces into the front subframe and vehicle body.

In accordance with another aspect, a front subframe for a vehicle body comprises left and right longitudinal members which extend in a longitudinal direction of a vehicle body. A front cross member extends in a transverse direction of the vehicle body so as to extend between front ends of the respective left and right longitudinal members. A rear cross member extends in the transverse direction of the vehicle body so as to extend between rear ends of the respective left and right longitudinal members. A left front bushing mount is provided on the front end of the left longitudinal member and a right front bushing mount is provided on the front end of the right longitudinal member. A left rear bushing mount is provided on the rear end of the left longitudinal member and a right rear bushing mount is provided on the rear end of the right longitudinal member. A left engagement member as part of the front subframe is fixedly provided at the front end of the left longitudinal member adjacent the left front bushing mount. A right engagement member as part of the front subframe is fixedly provided at the front end of the right longitudinal member adjacent the right front busing mount. Each of the left and right engagement members extends laterally outwardly in the transverse direction beyond an outer lateral side of each of the respective left and right longitudinal members and is substantially aligned with each of the respective left and right front bushing mounts. Each left and right engagement member includes an upper member secured to a lower member. The upper and lower members define a generally hollow section. Each engagement member is adapted to be engaged by an associated object during a narrow offset frontal collision and direct crash forces into the front subframe and vehicle body.

In accordance with yet another aspect, a front subframe for a vehicle body comprises left and right longitudinal members which extend in a longitudinal direction of a vehicle body. A front cross member extends in a transverse direction of the vehicle body so as to extend between front ends of the respective left and right longitudinal members. A rear cross member extends in the transverse direction of the vehicle body so as to extend between rear ends of the respective left and right longitudinal members. A left engagement member as part of the front subframe is fixedly provided at the front end of the left longitudinal member and a right engagement member as part of the front subframe is fixedly provided at the front end of the right longitudinal member. Each of the left and right engagement members extends laterally outwardly in the transverse direction beyond an outer lateral side of each of the respective left and right longitudinal members. Each left and right engagement member is generally triangular shaped in plan view and includes a first sidewall extending substantially parallel to the front cross member and a second sidewall canted outwardly in the transverse direction away from the respective left and right longitudinal members. Each engagement member is adapted to be engaged by an associated object during a narrow offset frontal collision and direct crash forces into the front subframe and vehicle body.

DETAILED DESCRIPTION

It should be understood that the description and drawings herein are merely illustrative and that various modifications and changes can be made in the structures disclosed without departing from the present disclosure. In general, the figures of the exemplary vehicle front subframes are not to scale. As used herein, lateral or transverse directions are across the vehicle, left and right directions. Likewise, longitudinal directions are forward and rearward direction of vehicle travel and the vertical directions relate to elevation. It will also be appreciated that the various identified components of the exemplary vehicle front subframes disclosed herein are merely terms of art that may vary from one manufacturer to another and should not be deemed to limit the present disclosure.

Figure 1:
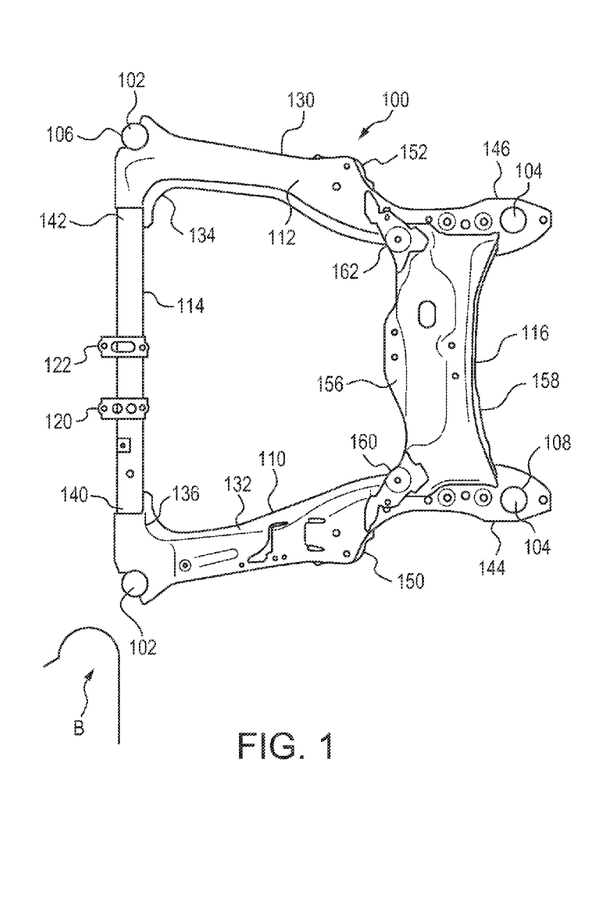
FIG. 1 is a top view of a known front subframe for a vehicle body structure having at least one upper part removed.

Referring now to the drawings, wherein like numerals refer to like parts throughout the several views, FIG. 1 illustrates a known front subframe 100 for a vehicle body structure. As is well known, the front subframe 100 is suspended from front portions of left and right front side frames (not shown) and front end portions of left and right floor frames (not shown) which extend rearwards from rear ends of the front side frames via four left front and rear and right front and rear vibration preventive elastic bushes received in front and rear through holes 102, 104 of front and rear bushing mounts 106, 108. The front subframe 100 includes left and right longitudinal members 110, 112 which extend in a longitudinal direction of the vehicle body (not shown). A front cross member 114 extends in a transverse direction of the vehicle body so as to extend between front ends of these longitudinal members 110, 112. A rear cross member 116 extends in the transverse direction of the vehicle body so as to extend between rear ends of the left and right longitudinal members 110, 112. The front cross member 114, which can be constituted by a round pipe, includes a power plant supporting portion, such as brackets 120, 122, attached to a center portion thereof.

Each of the left and right longitudinal members 110, 112 is formed from an upper side member 130 (upper side member 130 of the left longitudinal member 110 is removed for clarity) and a lower side member 132 (not visible on the right longitudinal member 112). Each upper side member 130 is adapted to fit securely over each respective lower side member 132. The respective front ends 134, 136 of the upper and lower side members 130, 132 are configured to receive end portions 140, 142 of the front cross member 114 and the bushing mounts 106. The respective rear ends 144, 146 of the upper and lower side members 130, 132 are configured to receive the bushing mounts 108. Each of the upper side members 130 and lower side members 132 of the left and right longitudinal members 110, 112 can be formed to have partially recessed and raised portions. Left and right reinforcement plates 150, 152 can be provided on bottom and outer side surfaces of the lower side members 132 between the front and rear cross members 114, 116.

The rear cross member 116 is also formed of an upper rear member 156 and a lower rear member 158 fixedly secured to the upper rear member. Each of the upper rear member 156 and lower rear member 158 spans between and interconnects the left and right longitudinal members 110, 112. Similar to the upper and lower side members 130, 132, the upper and lower rear members 156, 158 can be formed to have partially recessed and raised portions. Left and right secondary connecting or joining members 160, 162 extend between end portions of the upper rear member 156 and the respective left and right longitudinal members 110, 112.

As shown in FIG. 1, with the construction of the known front subframe 100, during a narrow offset frontal collision, the front subframe 100 can glance off a barrier B. Particularly, during a narrow offset frontal collision, the barrier B collides with one of the left and right front corners of the front subframe (the left front corner in FIG. 1). This engagement can deform that corner of the front subframe inwardly allowing the barrier to move along the respective longitudinal member 110, 112 allowing crash forces to go directly into the front wheel, suspension system and firewall instead of into the front subframe 100 and vehicle body structure.

FIGS. 2-8 illustrate an exemplary front subframe 200 according to one aspect of the present disclosure. The front subframe 200 has a construction similar to the known front subframe 100 described above except for an exemplary engagement member 202 for a narrow offset front collision. As shown, the front subframe 200 includes left and right longitudinal members 210, 212 which extend in a longitudinal direction of the vehicle body (not shown). A front cross member 214 extends in a transverse direction of the vehicle body so as to extend between front ends of these longitudinal members 210, 212. As shown, the front cross member 214 is substantially aligned with the engagement members 202 provided on the left and right longitudinal members 210, 212. A rear cross member 216 extends in the transverse direction of the vehicle body so as to extend between rear ends of the left and right longitudinal members 210, 212.

Each of the left and right longitudinal members 210, 212 is formed from an upper side member 230 and a lower side member 232. Each upper side member 230 is at least partially superposed on each respective lower side member 232 so as to be joined thereto. Front ends 234, 236 of the respective upper and lower side members 230, 232 are configured to receive end portions 240, 242 of the front cross member 214 and bushing mounts 206. Rear ends 244, 246 of the respective upper and lower side members 230, 232 are configured to receive bushing mounts 208. Left and right reinforcement plates 250, 252 can be provided on bottom and outer side surfaces of the lower side members 132. The rear cross member 216 is also formed of an upper rear member 256 and a lower rear member 258 secured beneath the upper rear member, each spanning between and interconnecting the left and right longitudinal members 210, 212. Left and right secondary connecting or joining members 260, 262 extend between end portions of the upper rear member 256 and the respective left and right longitudinal members 210, 212.

The exemplary engagement member 202 of the front subframe 200 for a narrow offset crash is located on each of the front ends of the left and right longitudinal members 210, 212, and extends laterally outwardly from the front ends of the left and right longitudinal members 210, 212. Specifically, each engagement member 202 includes an upper sub-member 270 and a lower sub-member 272. The upper sub-member 270 includes a top wall 274 having a first portion 276 and a second portion 278. The first portion 276 has a curved (semi-circular) recess 280 defined in an edge 282 dimensioned to receive at least a portion of the front bushing mount 206. The first portion 276 further includes a first section 284 and a second section 286 which is vertically offset from the first section such that the first and second sections 284, 286 define a step in the top wall 274. The second portion 278 of the top wall 274 generally follows the contour of the upper side member 230 and slopes downwardly from the first portion 276. The second portion 278 extends at least partially over the upper side member 230 and includes a mounting tab 288 having an aperture 290 extending therethrough. The aperture 290 is aligned with an aperture (not shown) provided on the upper side member 230. A second aperture 292 is provided on the first portion 276. The upper sub-member 270 further includes a first sidewall 294 and a second sidewall 296. The first sidewall 294 extends laterally along the front of the upper sub-member 270, and the second sidewall 296 extends longitudinally along a side of the upper side member 230.

The lower sub-member 272 includes a bottom wall 300 having a first portion 302 and a second portion 304. The first portion 302 has a curved (semi-circular) recess 310 defined in an edge 312 dimensioned to receive at least a portion of the front bushing mount 206. The second portion 304 of the bottom wall 300 generally follows the contour of the lower side member 232 and also slopes downwardly from the first portion 302. The second portion 304 extends at least partially over the lower side member 232 and includes and includes a mounting tab 320 having an aperture 322 extending therethrough. The aperture 322 is aligned with an aperture (not shown) provided on the lower side member 232. A fastener can extend through the aperture 290, the apertures on the upper and lower side members 230, 232 and the aperture 322 to securely attach the upper sub-member 270 to the upper side member 230 and the lower sub-member 272 to the lower side member 232. A second aperture 326 is provided on the first portion 302 and is aligned with the second aperture 292. A fastener can extend through the second apertures to further secure the upper sub-member 270 to the lower sub-member 272. Although, it should be appreciated that in lieu of fasteners, the upper and lower sub-members 270, 272 can fixedly attached to respective upper and lower side members 230, 232 by any mechanical means known in the art, such as but not limited to welding. According to this aspect, the apertures provided on the upper and lower sub-members 270, 272 can serve as datum openings that allow for proper alignment of the upper and lower sub-members prior to a welding process.

Figure 7:
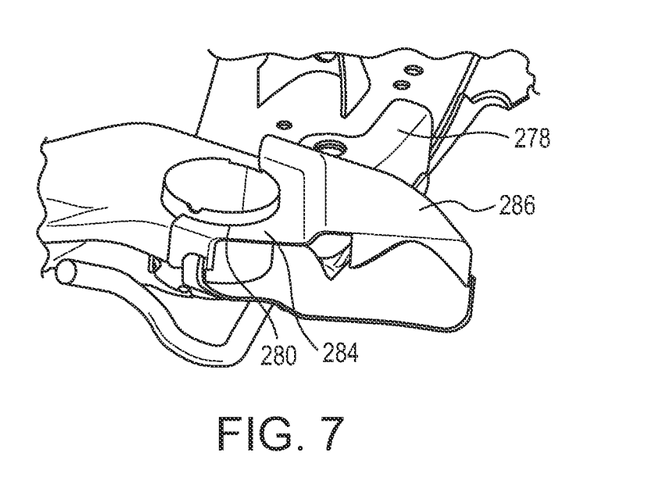
FIGS. 7 and 8 are partial cross-sectional perspective views of the front subframe of FIG. 2.
Figure 8:
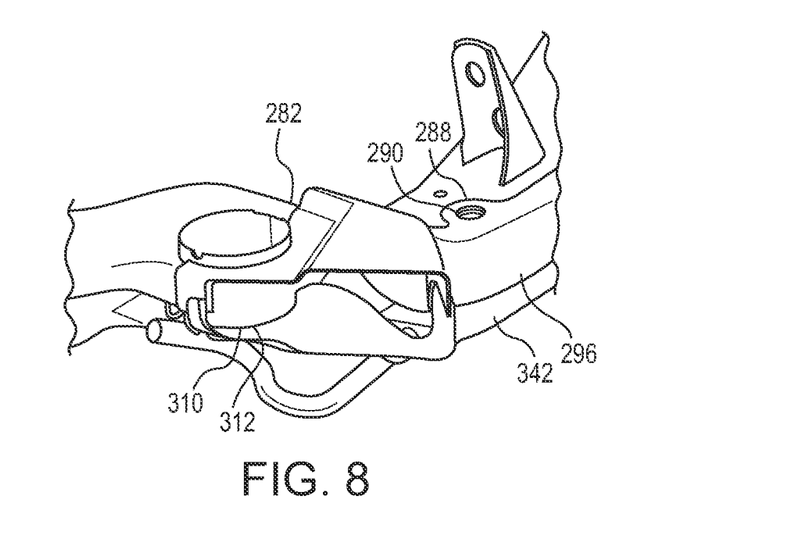

The lower sub-member 272 further includes a first sidewall 340 and a second sidewall 342. The first sidewall 340 extends laterally along the front of the lower sub-member 272 and is at least partially overlapped by the first sidewall 294. The second sidewall 342 extends longitudinally along a side of the lower side member 232 and is at least partially overlapped by the second sidewall 296. In this overlapped condition, the first and second sidewalls 294, 296 of the upper sub-member 270 can be fixedly attached to the first and second sidewalls 340, 342 of the lower sub-member 272. Further, with the shape of the upper and lower sub-members 270, 272, when connected together, as depicted in FIGS. 7 and 8, the upper and lower sub-members 270, 272 define a generally hollow engagement member 202.

Figure 2:
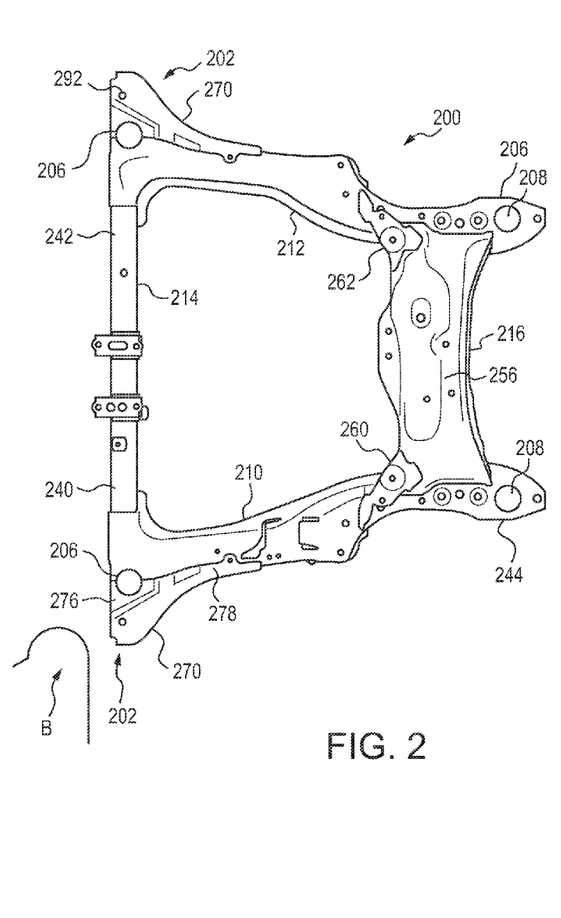
FIG. 2 is a top view of an exemplary front subframe for a vehicle body structure, the front subframe including an engagement member according to one aspect of the present disclosure adapted for a small overlap or narrow offset frontal collision.
Figure 3:
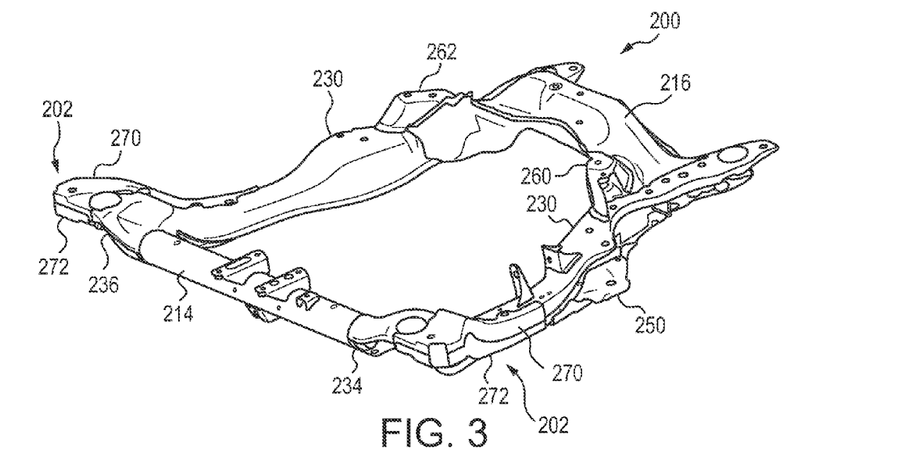
FIG. 3 is a perspective view of the front subframe of FIG. 2.
Figure 4:
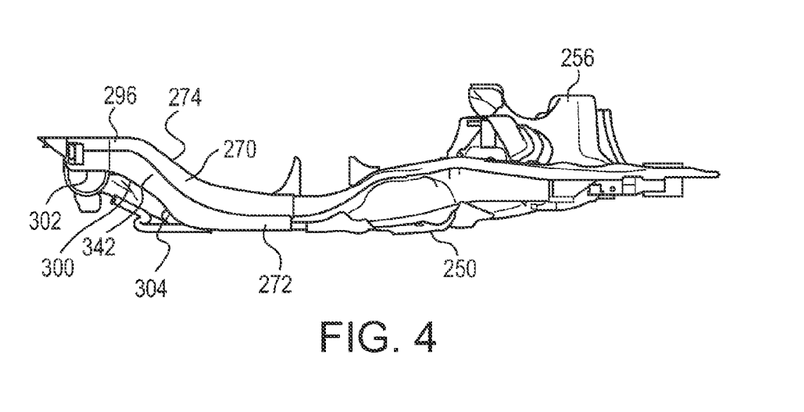
FIG. 4 is a side view of the front subframe of FIG. 2.
Figure 5:
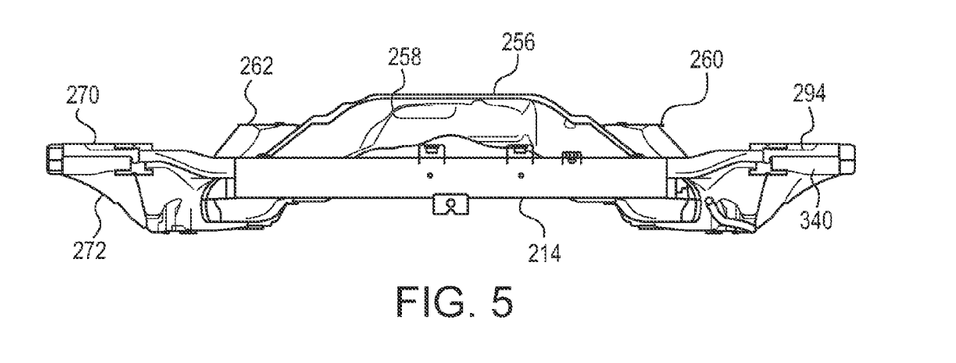
FIG. 5 is a front view of the front subframe of FIG. 2.
Figure 6:
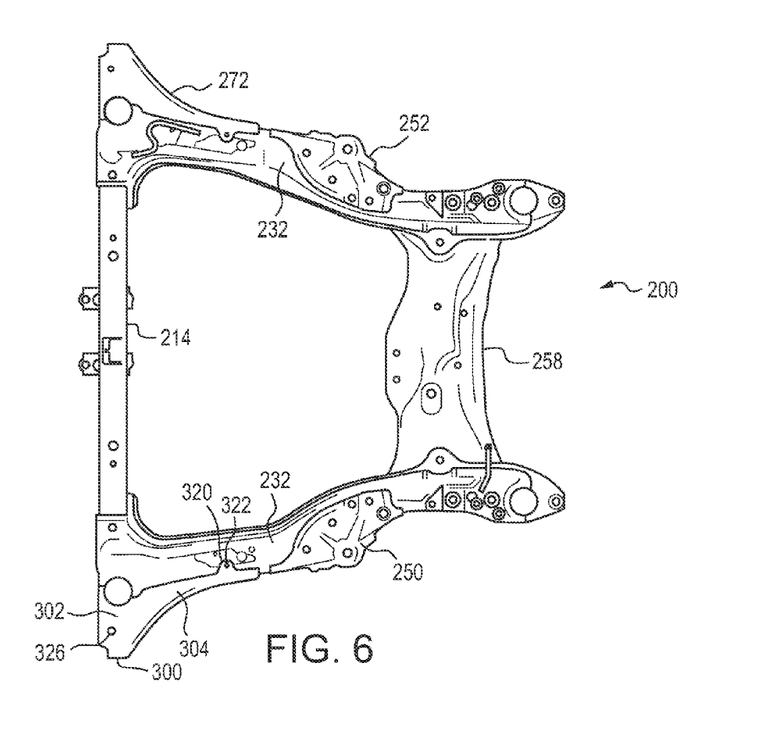
FIG. 6 is a bottom view of the front subframe of FIG. 2.

As shown in FIG. 2, with the construction of the exemplary front subframe 200, during a narrow offset frontal collision, the engagement member 202 of the front subframe 200, which extends laterally outwardly from each of the left and right longitudinal members 210, 212, engages the barrier B. This engagement allows crash forces to be directed into the front subframe 200 and the vehicle body structure.

Figure 9:
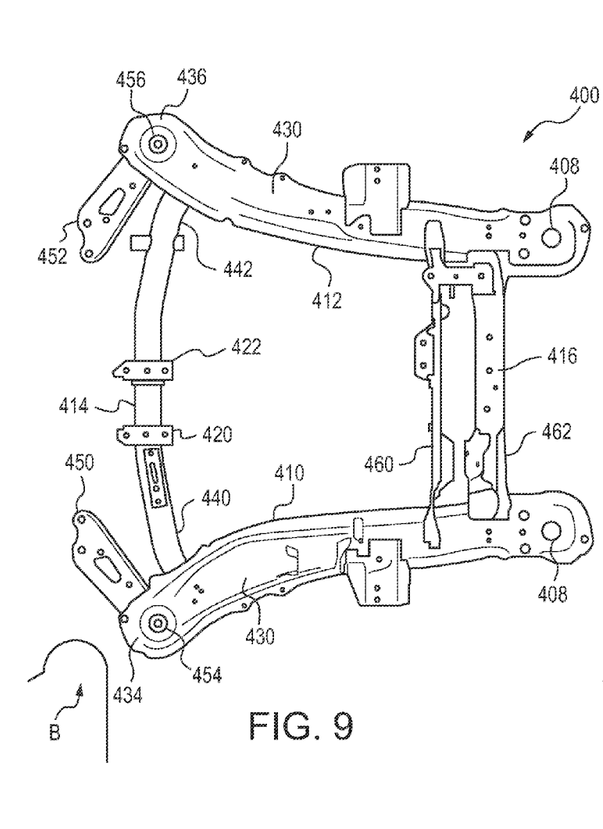
FIG. 9 is a top view of another known front subframe for a vehicle body structure.

FIG. 9 illustrates another known front subframe 400 for a vehicle body structure. The front subframe 400 includes left and right longitudinal members 410, 412 which extend in a longitudinal direction of the vehicle body. A front cross member 414 extends in a transverse direction of the vehicle body so as to extend between front ends of these longitudinal members 410, 412. A rear cross member 416 extends in the transverse direction of the vehicle body so as to extend between rear ends of the left and right longitudinal members 410, 412. The front cross member 414, which can be constituted by a round pipe, includes a power plant supporting portion, such as brackets 420, 422, attached to a center portion thereof.

Each of the left and right longitudinal members 410, 412 is formed from an upper side member 430 and a lower side member (not visible), which is fixedly secured to the upper side member 430. Front ends 434, 436 of the respective left and right longitudinal members 410, 412 are configured to receive end portions 440, 442 of the front cross member 414. Rear ends 444, 446 of the respective left and right longitudinal members 410, 412 are configured to receive bushing mounts 408. Each of the upper side members 430 and lower side members of the left and right longitudinal members 410, 412 can be formed to have partially recessed and raised portions. Left and right stays 450, 452 are secured to the respective front ends 434, 436. The left stay 450 has an end 454 secured to the front end 434 of the left longitudinal member 410 and extends laterally toward the right stay 452. Similarly, the right stay 452 has an end 456 secured to the front end 436 of the right longitudinal member 412 and extends laterally toward the left stay 450. Each of the left and right stays 450, 452 is canted slightly forwardly relative to the front cross member 414 and laterally inward. The rear cross member 416 is defined by a first transverse member 460 and a second transverse member 462. Each of the first and second transverse members 460, 462 spans between and interconnects the left and right longitudinal members 410, 412.

As shown in FIG. 9, with the construction of the known front subframe 400, during a narrow offset frontal collision, the front subframe 400 can glance off the barrier B. Particularly, during a narrow offset frontal collision, because the stays 450, 452 are confined between the left and right longitudinal members 410, 412, the barrier B collides with one of the left and right front corners of the front subframe 400 (the left front corner in FIG. 9). This engagement can deform that corner of the front subframe inwardly allowing the barrier to move along the respective longitudinal member 410, 412 allowing crash forces to go directly into the front wheel, suspension system and firewall instead of into the front subframe 400 and vehicle body structure.

FIGS. 10-15 illustrate an exemplary front subframe 500 according to another aspect of the present disclosure. The front subframe 500 has a construction similar to the known front subframe 400 described above except for an exemplary engagement member 502 for a narrow offset front collision provided forward of a front cross member. As shown, the front subframe 500 includes left and right longitudinal members 510, 512 which extend in a longitudinal direction of the vehicle body (not shown). The front cross member 514 extends in a transverse direction of the vehicle body so as to extend between front ends of these longitudinal members 510, 512. A rear cross member 516 extends in the transverse direction of the vehicle body so as to extend between rear ends of the left and right longitudinal members 510, 512.

Each of the left and right longitudinal members 510, 512 is formed from an upper side member 530 and a lower side member 532. Each upper side member 530 is at least partially superposed on each respective lower side member 532 so as to be joined thereto. Front ends 534, 536 of the respective upper and lower side members 530, 532 are configured to receive end portions 540, 542 of the front cross member 514 and bushing mounts 506. Rear ends 544, 546 of the respective upper and lower side members 530, 532 are configured to receive bushing mounts 508. The rear cross member 516 is defined by a first transverse member 560 and a second transverse member 562.

The exemplary engagement member 502 of the front subframe 500 for a narrow offset crash is connected to each of the front ends of the left and right longitudinal members 510, 512, and extends laterally outwardly from the front ends of the left and right longitudinal members 510, 512. This connection can be made by a fastener or other assembly that connects a bushing (not shown) with the front subframe 500. Specifically, each engagement member 502 includes an upper member 570 and a lower member 572 secured thereto. The upper member 570 includes a top wall 574 and a downwardly extending sidewall 576. As depicted, the sidewall 576 is provided about a periphery of the top wall 574. The top wall 574 further includes a first portion 580 and a second portion 582. The first portion 580 extends laterally outwardly from each respective left and right longitudinal member 510, 512. In the exemplary embodiment, the first portion 580 is generally triangular shaped (top view) with the sidewall 582 converging to a distal end portion 586. The second portion 582 of the top wall 574, which is sized smaller than the first portion 580, extends laterally inwardly from each respective left and right longitudinal member 510, 512 similar to the left and right stays 450, 452. Apertures 590 extend through the top wall 574.

Figure 15:
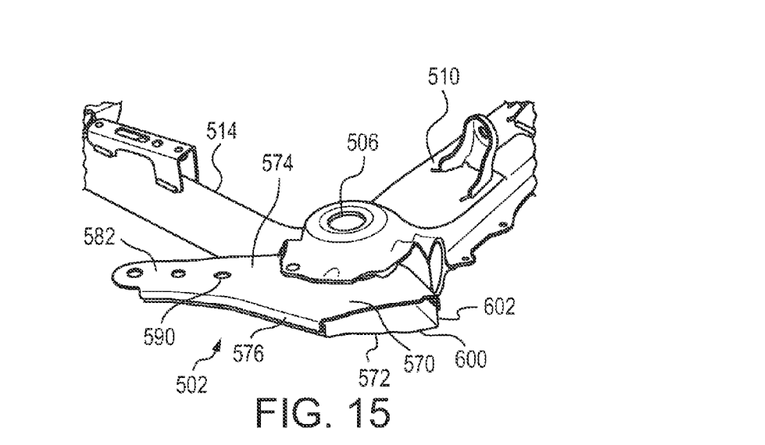
FIG. 15 is a partial cross-sectional perspective view of the front subframe of FIG. 10.

The lower member 572, which can be a mirror image of the upper member 570, includes a bottom wall 600 and an upwardly extending sidewall 602 provided about a periphery of the bottom wall 600. The bottom wall 600 further includes a first portion 610 and a second portion 612. The first portion 610 extends laterally outwardly from each respective left and right longitudinal member 510, 512. In the exemplary embodiment, the first portion 610 is generally triangular shaped (bottom view) with the sidewall 602 converging to a distal end portion 616. The second portion 612 of the bottom wall 600, which is sized smaller than the first portion 610, extends laterally inwardly from each respective left and right longitudinal member 510, 512 similar to the left and right stays 450, 452. Apertures 620 extend through the bottom wall 600 and are aligned with the apertures 590. Fasteners can extend through the apertures 590, 620 to securely attach the upper member 570 to the lower member 572. Although, it should be appreciated that in lieu of fasteners, the upper and lower members 570, 572 can fixedly attached by any mechanical means known in the art, such as but not limited to welding. According to this aspect, the apertures provided on the upper and lower members 570, 572 can serve as datum openings that allow for proper alignment of the upper and lower members prior to a welding process. For example, as best depicted in FIG. 15, the sidewall 576 overlaps the sidewall 602. In this overlapped condition, the sidewalls 576, 602 can be fixedly attached such as by welding. Further, with the shape of the upper and lower members 570, 572, when connected together, as shown in FIG. 15, the upper and lower members define a generally hollow engagement member 502.

Figure 10:
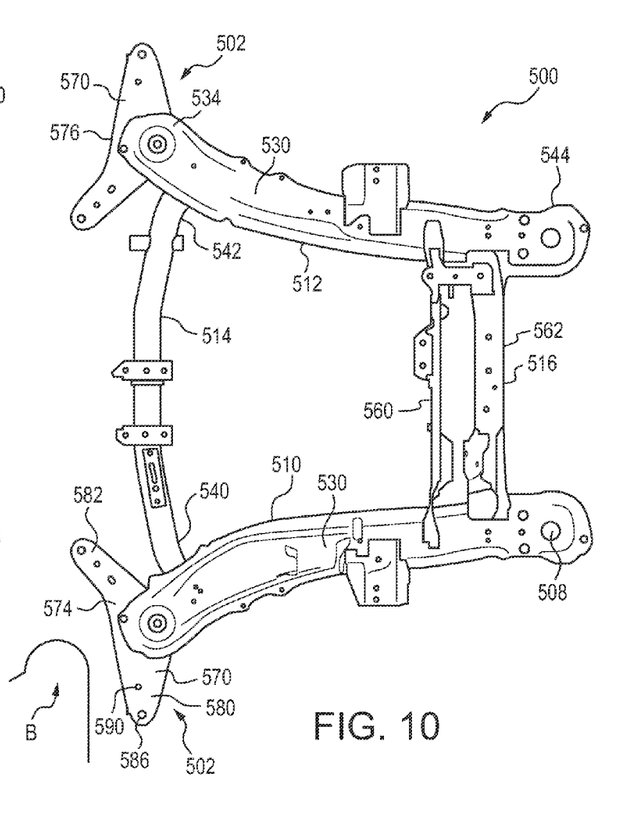
FIG. 10 is a top view of an exemplary front subframe for a vehicle body structure, the front subframe including an engagement member according to another aspect of the present disclosure adapted for a small overlap or narrow offset frontal collision.
Figure 11:
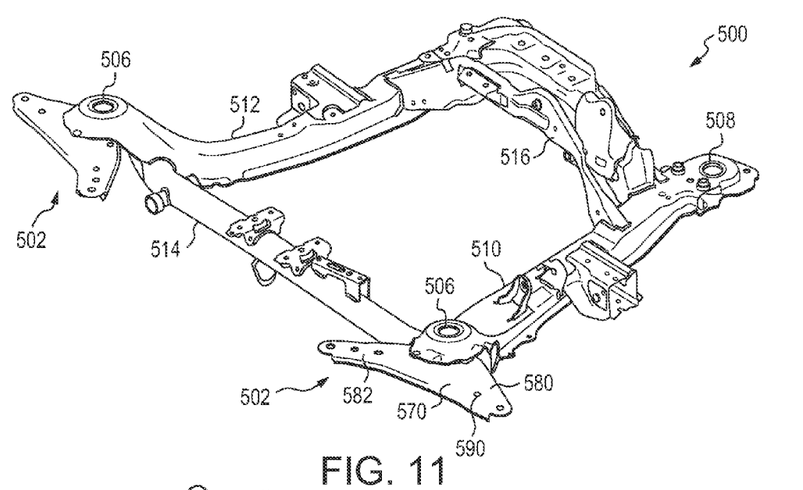
FIG. 11 is a perspective view of the front subframe of FIG. 10.
Figure 12:
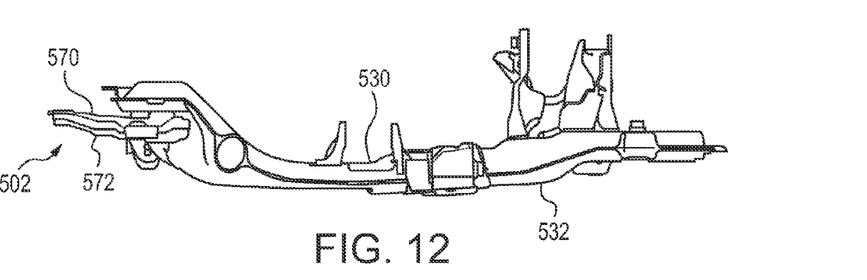
FIG. 12 is a side view of the front subframe of FIG. 10.
Figure 13:
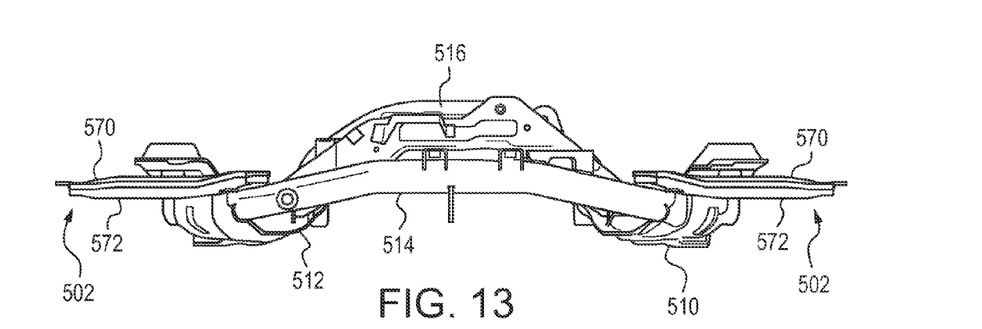
FIG. 13 is a front view of the front subframe of FIG. 10.
Figure 14:
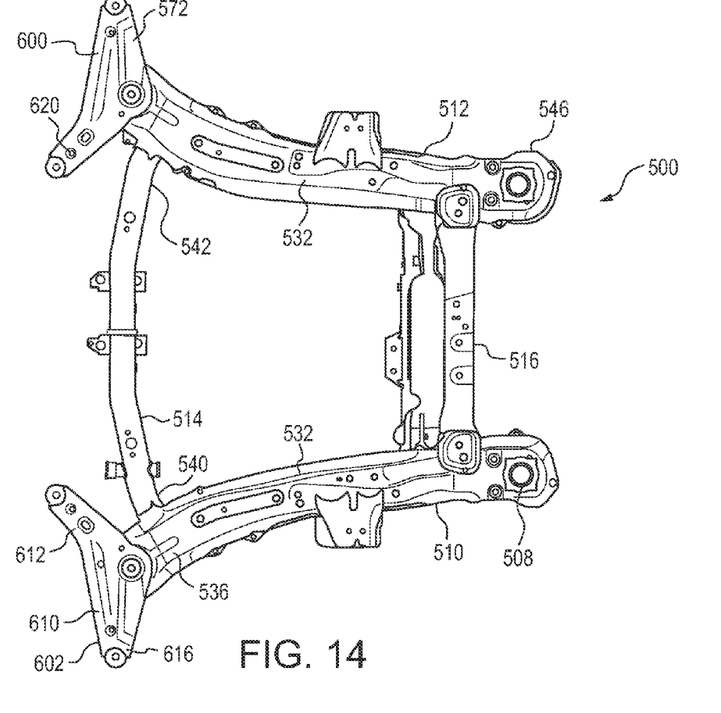
FIG. 14 is a bottom view of the front subframe of FIG. 10.

As shown in FIG. 10, with the construction of the exemplary front subframe 500, during a narrow offset frontal collision, the engagement member 502 of the front subframe 500, which includes the portion that extends laterally outwardly from each of the left and right longitudinal members 510, 512, engages the barrier B. Similar to the exemplary front subframe 200, this engagement allows crash forces to be directed into the front subframe 500 and vehicle body structure.

Figure 16:
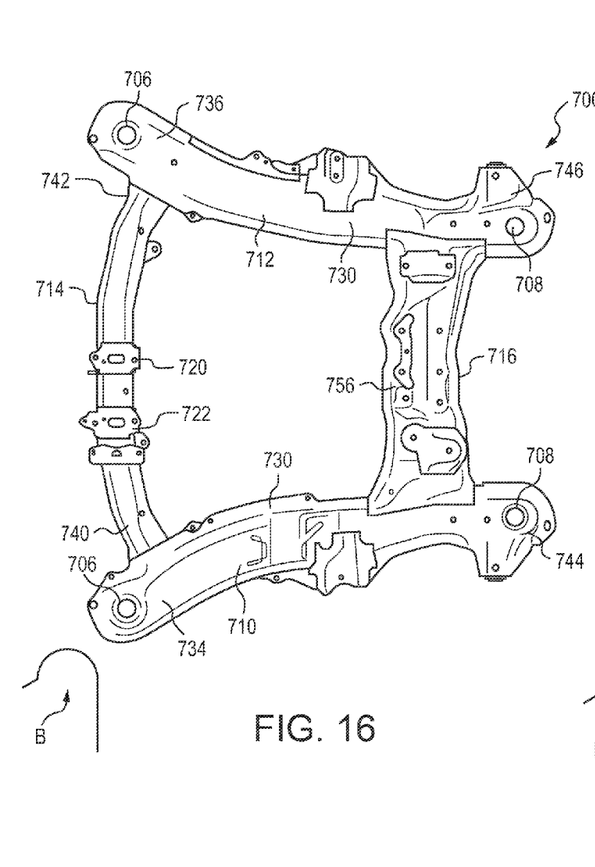
FIG. 16 is a top view of another known front subframe for a vehicle body structure.

FIG. 16 illustrates another known front subframe 700 for a vehicle body structure. The front subframe 700 includes left and right longitudinal members 710, 712 which extend in a longitudinal direction of the vehicle body. A front cross member 714 extends in a transverse direction of the vehicle body so as to extend between front ends of these longitudinal members 710, 712. A rear cross member 716 extends in the transverse direction of the vehicle body so as to extend between rear ends of the left and right longitudinal members 710, 712. The front cross member 714, which can be constituted by a round pipe, includes a power plant supporting portion, such as brackets 720, 722, attached to a center portion thereof.

Each of the left and right longitudinal members 710, 712 is formed from an upper side member 730 and a lower side member (not visible), which is fixedly secured to the upper side member 730. Front ends 734, 736 of the respective left and right longitudinal members 710, 712 are configured to receive end portions 740, 742 of the front cross member 714 and front bushing mounts 706. Rear ends 744, 746 of the respective left and right longitudinal members 710, 712 are configured to receive bushing mounts 708. Each of the upper side members 730 and lower side members of the left and right longitudinal members 710, 712 can be formed to have partially recessed and raised portions. The rear cross member 716 is also formed of an upper rear member 756 and a lower rear member (not visible), which is fixedly secured to the upper rear member. Each of the upper rear member and lower rear member spans between and interconnects the left and right longitudinal members 710, 712. Similar to the upper and lower side members, the upper and lower rear members can be formed to have partially recessed and raised portions.

As shown in FIG. 16, with the construction of the known front subframe 700, during a narrow offset frontal collision, the front subframe 700 can glance off the barrier B. Particularly, during a narrow offset frontal collision, the barrier B collides with one of the left and right front corners of the front subframe (the left front corner in FIG. 16). This engagement can deform that corner of the front subframe inwardly allowing the barrier to move along the respective longitudinal member 710, 712 allowing crash forces to go directly into the front wheel, suspension system and firewall instead of into the front subframe 700 and vehicle body structure.

FIGS. 17-23 illustrate an exemplary front subframe 800 according to yet another aspect of the present disclosure. The front subframe 800 has a construction similar to the known front subframe 700 described above except for an exemplary engagement member 802 for a narrow offset front collision. As shown, the front subframe 800 includes left and right longitudinal members 810, 812 which extend in a longitudinal direction of the vehicle body (not shown). A front cross member 814 extends in a transverse direction of the vehicle body so as to extend between front ends of these longitudinal members 810, 812. As shown, the front cross member 814 is located rearward of the engagement members 802 provided on the left and right longitudinal members 810, 812. A rear cross member 816 extends in the transverse direction of the vehicle body so as to extend between rear ends of the left and right longitudinal members 810, 812.

Each of the left and right longitudinal members 810, 812 is formed from an upper side member 830 and a lower side member 832. Each upper side member 830 is at least partially superposed on each respective lower side member 832 so as to be joined thereto. Front ends 834, 836 of the respective upper and lower side members 830, 832 are mounted to end portions 840, 842 of the front cross member 814 and bushing mounts 806. Rear ends 844, 846 of the respective upper and lower side members 830, 832 are configured to receive bushing mounts 808. The rear cross member 816 is also formed of an upper rear member 856 and a lower rear member 858 secured beneath the upper rear member, each spanning between and interconnecting the left and right longitudinal members 810, 812.

Figure 17:
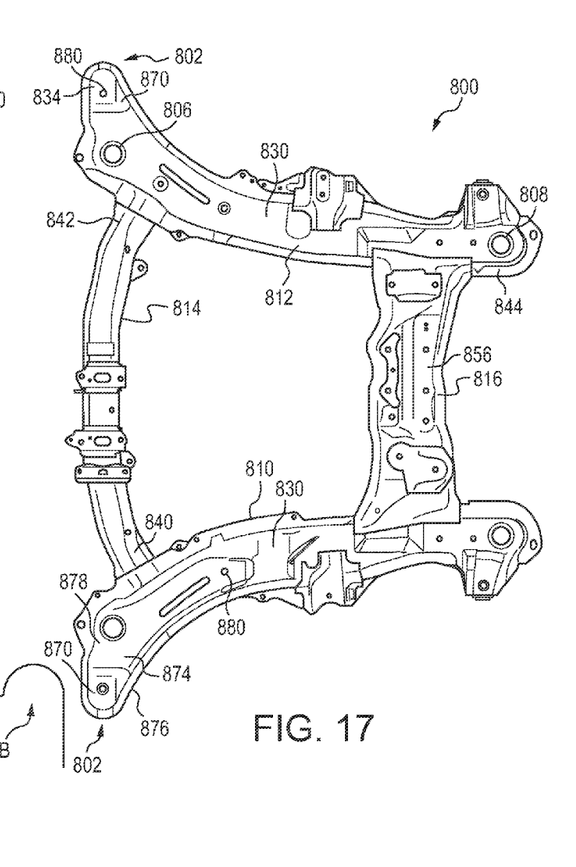
FIG. 17 is a top view of an exemplary front subframe for a vehicle body structure, the front subframe including an engagement member according to yet another aspect of the present disclosure adapted for a small overlap or narrow offset frontal collision.
Figure 18:
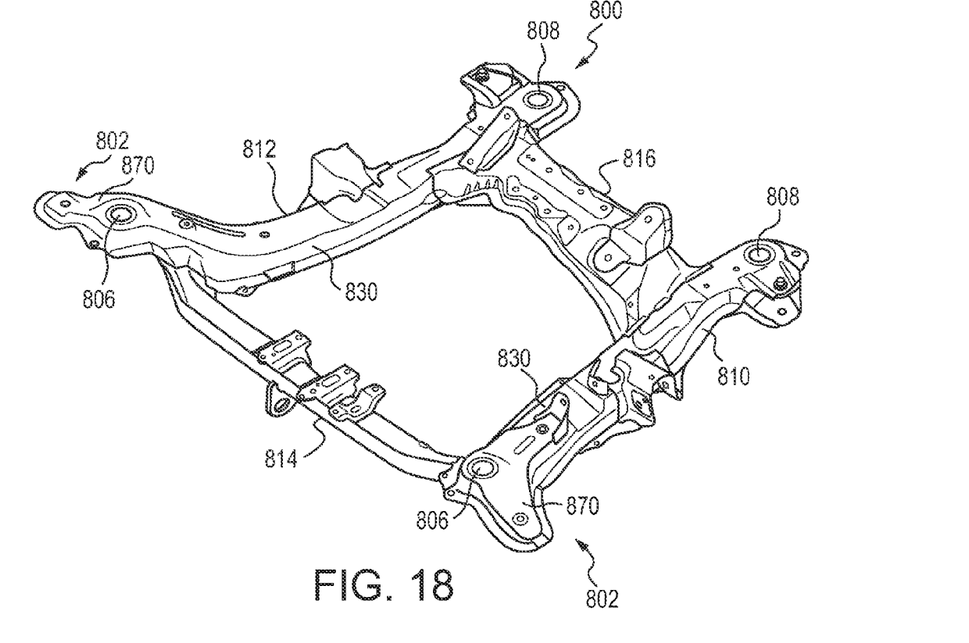
FIG. 18 is a perspective view of the front subframe of FIG. 17.

As shown in FIG. 17, the exemplary engagement member 802 of the front subframe 800 for a narrow offset crash is shaped to engage the barrier B and, as will be described below, internal reinforcement(s) is added to increase subframe load carrying capacity. The engagement member 802 of the front subframe 800 is located on each of the front ends of the left and right longitudinal members 810, 812, and extends laterally outwardly from the front ends of the left and right longitudinal members 810, 812 forward of the front cross member 814. Specifically, each engagement member 802 includes an upper sub-member 870 extending laterally from and integrally formed with the upper side member 830 and a lower sub-member 872 extending laterally from and integrally formed with the lower side member 832. The upper sub-member 870 includes a top wall 874 having a peripheral edge portion 876 and a raised portion 878. The raised portion 878 is provided over the bushing mount 806. Apertures 880 are provided on the top wall 874. Similarly, the lower sub-member 872 includes a bottom wall 900 having a peripheral edge portion 902 and a depressed portion 904. The bushing mount 806 is seated on a section of the peripheral edge portion 902. Apertures 910 are provided on the bottom wall 900 and are aligned with the apertures 880. Fasteners can extend through the apertures 880, 910 to securely attach the upper sub-member 870 to the lower sub-member 872. Although, it should be appreciated that in lieu of fasteners, the upper and lower sub-members 870, 872 can fixedly attached by any mechanical means known in the art, such as but not limited to welding. According to this aspect, the apertures provided on the upper and lower sub-members 870, 872 can serve as datum openings that allow for proper alignment of the upper and lower sub-members prior to a welding process. For example, the peripheral edge portion 876 of the upper sub-member 870 can be welded to the peripheral edge portion 902 of the lower sub-member 872.

Figure 19:
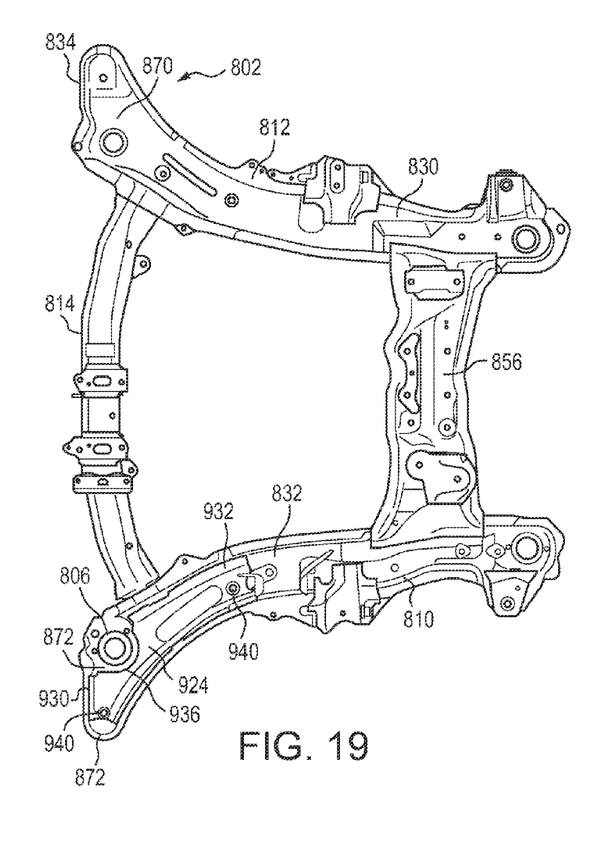
FIG. 19 is a top view of the front subframe of FIG. 17 with the upper side member removed.
Figure 20:
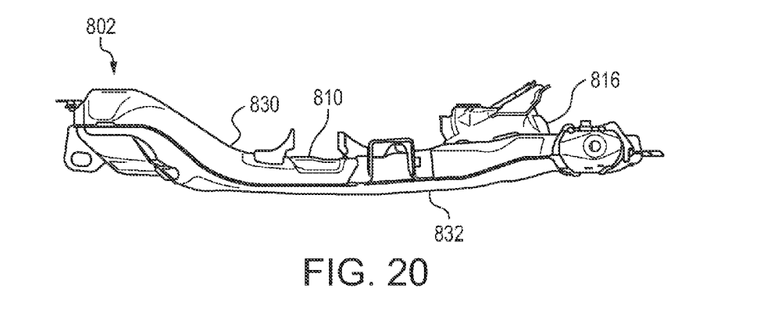
FIG. 20 is a side view of the front subframe of FIG. 17.
Figure 21:
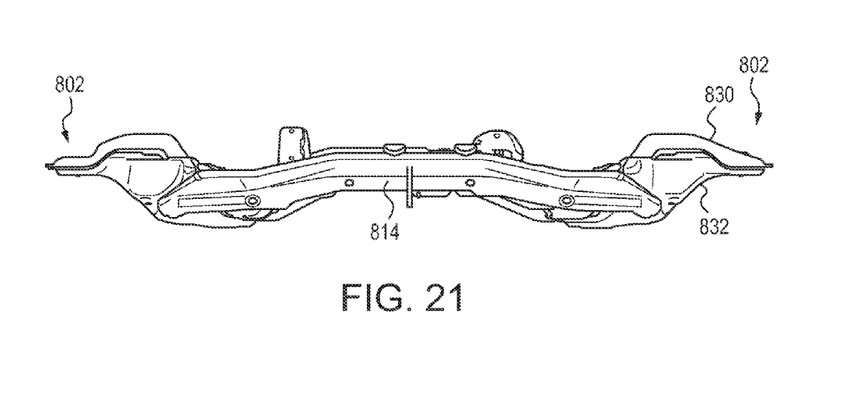
FIG. 21 is a front view of the front subframe of FIG. 17.
Figure 22:
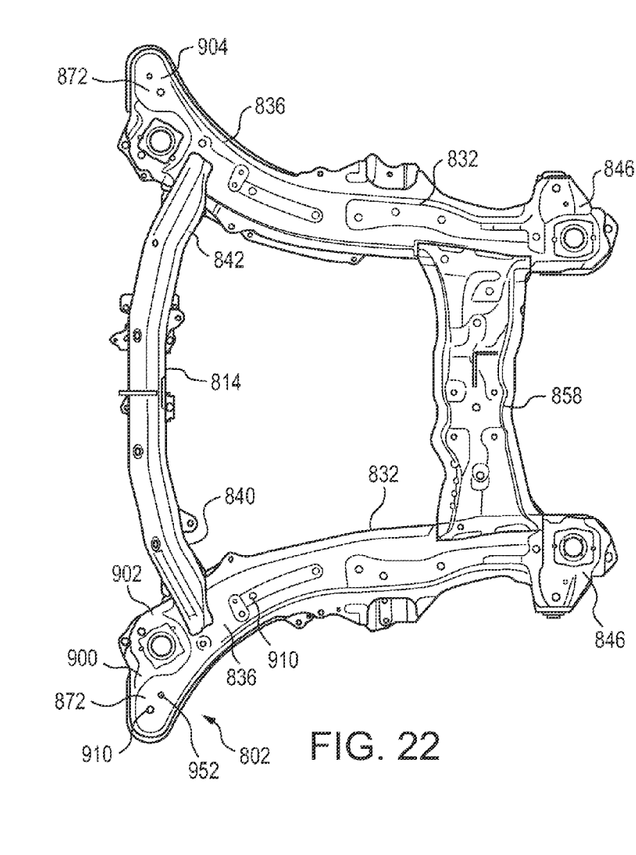
FIG. 22 is a bottom view of the front subframe of FIG. 17.
Figure 23:
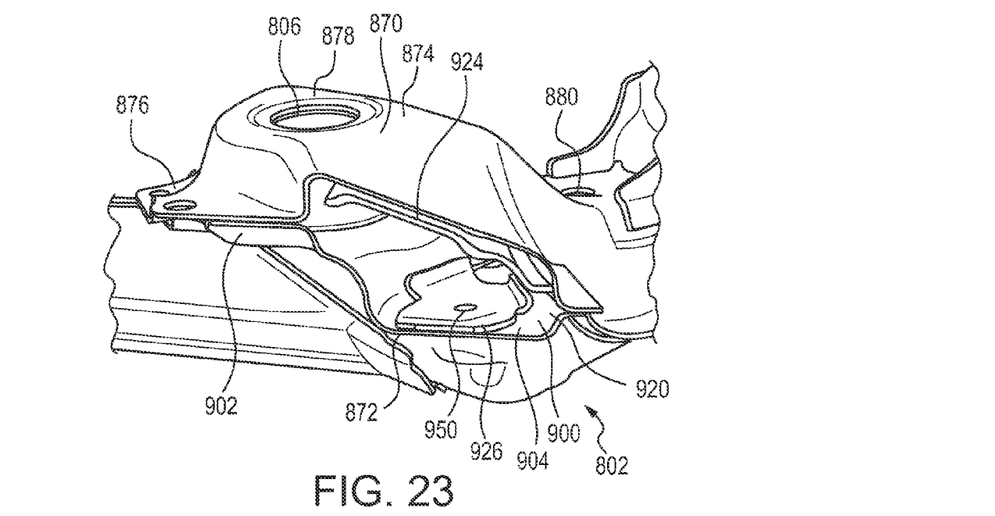
FIG. 23 is a partial cross-sectional perspective view of the front subframe of FIG. 17.

As best depicted in FIG. 23, the raised portion 878 of the upper-sub-member 870 and the depressed portion 904 of the lower sub-member 872 define a cavity or chamber 920. As indicated previously, internal reinforcement(s) is added to increase subframe load carrying capacity. In the depicted embodiment, the internal reinforcement(s) includes a first bulkhead 924 and a second bulkhead 926, each bulkhead being at least partially housed in the chamber 920. The first bulkhead 924 extends longitudinally along each of the left and right longitudinal members 810, 812. Particularly, as best shown in FIG. 19, the first bulkhead 924 includes a forward end portion 930 and a rearward end portion 932. The forward end portion 930 extends laterally outwardly from each of the left and right longitudinal members 810, 812 and is interposed between the upper and lower sub-members 870, 872. The rearward end portion 932 extends rearward of the front cross member 814 and is interposed between the upper and lower side members 830, 832. The first bulkhead 924 includes a curved recess 936 allowing the first bulkhead 924 to extend at least partially around the bushing mount 806. Similar to the upper and lower side members 830, 832, the first bulkhead 924 can be formed to have partially recessed and raised portions. Openings 940 are provided on the first bulkhead 924, the openings 940 being aligned with the apertures 880, 910 of the respective upper and lower sub-members 870, 872 thereby providing a means to secure the bulkhead within each of the left and right longitudinal members 810, 812. The second bulkhead 926 is disposed beneath the forward end portion 930 of the first bulkhead 924 and is sized to at least partially sit on the bottom wall 900 of the lower sub-member 872. The second bulkhead includes an opening 950, which can be aligned with the forward mounting opening 940 of the first bulkhead 924 and forward apertures 830, 832 of the respective upper and lower sub-members 870, 872 or aligned with another aperture 952 located on the bottom wall 900 of the lower sub-member 872.

As shown in FIG. 17, with the construction of the exemplary front subframe 800, during a narrow offset frontal collision, the engagement member 802 of the front subframe 800, which includes the integrally formed, reinforced portion 870, 872 that extends laterally outwardly from each of the left and right longitudinal members 810, 812, engages the barrier B. Similar to the exemplary front subframes 200 and 500, this engagement allows crash forces to be directed into the front subframe 800 and vehicle body structure.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the present disclosure and the following claim(s).

What is claimed is:

1. A front subframe for a vehicle body comprises:
  left and right longitudinal members which extend in a longitudinal direction of a vehicle body;

a front cross member extending in a transverse direction of the vehicle body so as to extend between front ends of the respective left and right longitudinal members;

a rear cross member extending in the transverse direction of the vehicle body so as to extend between rear ends of the respective left and right longitudinal members; and a left engagement member as part of the front subframe and fixedly provided at the front end of the left longitudinal member and a right engagement member as part of the front subframe and fixedly provided at the front end of the right longitudinal member, each of the left and right engagement members extending laterally outwardly in the transverse direction beyond an outer lateral side of each of the respective left and right longitudinal members, wherein each engagement member is adapted to be engaged by an associated object during a narrow offset frontal collision and direct crash forces into the front subframe and vehicle body, wherein each left and right engagement member includes an upper member secured to a lower member, the upper and lower members defining a generally hollow section of the engagement member.

2. The front subframe of claim 1, wherein each left and right engagement member is separate from each of the respective left and right longitudinal members, the upper member including a top wall and a sidewall, the top wall extending over an upper portion of each respective left and right longitudinal member, and the lower member including a bottom wall and a sidewall, the bottom wall extending over a lower portion of each respective left and right longitudinal member, the sidewalls of the upper member and lower member overlapping, and wherein a front end of each left and right engagement member is substantially aligned with the front end of each respective left and right longitudinal member.

3. The front subframe of claim 1, wherein the upper member and the lower member at least partially surround a bushing mount provided at the front end of each respective left and right longitudinal member.

4. The front subframe of claim 1, wherein each left and right engagement member is separate from each of the respective left and right longitudinal members, the upper member including a top wall and a sidewall, and the lower member including a bottom wall and a sidewall, the sidewall of the upper member overlapping the sidewall of the lower member, wherein each of the top wall and bottom wall includes a first portion extending laterally outwardly from each respective left and right longitudinal member and a second portion extending laterally and inwardly from each respective left and right longitudinal member.

5. The front subframe of claim 4, wherein each first portion of the upper and lower members is generally triangular shaped in plan view.

6. The front subframe of claim 4, wherein each left and right engagement member extends forwardly of the front end of each respective left and right longitudinal member.

7. The front subframe of claim 1, wherein each left and right engagement member is integrally formed with each of the respective left and right longitudinal members.

8. The front subframe of claim 1, wherein each left and right engagement member defines an interior chamber and further includes a reinforcement at least partially housed in the interior chamber of each engagement member.

9. The front subframe of claim 8, wherein the reinforcement includes a first bulkhead and a separate second bulkhead, each bulkhead being at least partially housed in the chamber, the first bulkhead being secured to the upper member and the second bulkhead being secured to the lower member.

10. The front subframe of claim 9, wherein the first bulkhead of each left and right engagement member extends longitudinally along each of the respective left and right longitudinal members, the first bulkhead including a forward end portion and a rearward end portion, the forward end portion extending laterally outwardly from each of the left and right longitudinal members and the rearward end portion extending rearward of the front cross member, and wherein the second bulkhead is disposed beneath the forward end portion of the first bulkhead.

11. A front subframe for a vehicle body comprises:

left and right longitudinal members which extend in a longitudinal direction of a vehicle body;

a front cross member extending in a transverse direction of the vehicle body so as to extend between front ends of the respective left and right longitudinal members;

a rear cross member extending in the transverse direction of the vehicle body so as to extend between rear ends of the respective left and right longitudinal members;

a left front bushing mount provided on the front end of the left longitudinal member and a right front bushing mount provided on the front end of the right longitudinal member;

a left rear bushing mount provided on the rear end of the left longitudinal member and a right rear bushing mount provided on the rear end of the right longitudinal member;

a left engagement member as part of the front subframe and fixedly provided at the front end of the left longitudinal member adjacent the left front bushing mount; and a right engagement member as part of the front subframe and fixedly provided at the front end of the right longitudinal member adjacent the right front busing mount, wherein each of the left and right engagement members extends laterally outwardly in the transverse direction beyond an outer lateral side of each of the respective left and right longitudinal members and is substantially aligned with each of the respective left and right front bushing mounts, each left and right engagement member including an upper member secured to a lower member, the upper and lower members defining a generally hollow section, wherein each engagement member is adapted to be engaged by an associated object during a narrow offset frontal collision and direct crash forces into the front subframe and vehicle body.

12. The front subframe of claim 11, wherein each left and right engagement member is separate from each of the respective left and right longitudinal members, the upper member including a top wall and a sidewall, the top wall extending over an upper portion of each respective left and right longitudinal member, and the lower member including a bottom wall and a sidewall, the bottom wall extending over a lower portion of each respective left and right longitudinal member, the sidewalls of the upper member and lower member overlapping, and wherein a front sidewall portion of each left and right engagement member is substantially aligned with the front end of each respective left and right longitudinal member.

13. The front subframe of claim 11, wherein each left and right engagement member is separate from each of the respective left and right longitudinal members, the upper member including a top wall and a sidewall, and the lower member including a bottom wall and a sidewall, the sidewall of the upper member overlapping the sidewall of the lower member, wherein each of the top wall and bottom wall includes a first portion extending laterally outwardly from each respective left and right longitudinal member and a second portion extending laterally and inwardly from each respective left and right longitudinal member.

14. The front subframe of claim 11, wherein each left and right engagement member is integrally formed with each of the respective left and right longitudinal members, each left and right engagement member defining an interior chamber for housing a first bulkhead and a separate second bulkhead, the first bulkhead being secured to the upper member and the second bulkhead being secured to the lower member.

15. The front subframe of claim 11, wherein each left and right engagement member is connected to the respective front bushing mount of each respective left and right longitudinal member.

16. The front subframe of claim 11, wherein each left and right engagement member is generally triangular shaped and includes a sidewall engaged to and canted outwardly in the transverse direction away from the respective left and right longitudinal members.

17. A front subframe for a vehicle body comprises:
left and right longitudinal members which extend in a longitudinal direction of a vehicle body;
a front cross member extending in a transverse direction of the vehicle body so as to extend between front ends of the respective left and right longitudinal members;
a rear cross member extending in the transverse direction of the vehicle body so as to extend between rear ends of the respective left and right longitudinal members; and
a left engagement member as part of the front subframe and fixedly provided at the front end of the left longitudinal member and a right engagement member as part of the front subframe and fixedly provided at the front end of the right longitudinal member, each of the left and right engagement members extending laterally outwardly in the transverse direction beyond an outer lateral side of each of the respective left and right longitudinal members, each left and right engagement member being generally triangular shaped in plan view and including a first sidewall extending substantially parallel to the front cross member, and a second sidewall canted outwardly in the transverse direction away from the respective left and right longitudinal members, wherein each engagement member is adapted to be engaged by an associated object during a narrow offset frontal collision and direct crash forces into the front subframe and vehicle body.

18. The front subframe of claim 17, wherein each left and right engagement member is connected to a front bushing mount provided on each respective left and right longitudinal member.

19. The front subframe of claim 17, wherein each left and right engagement member extends forwardly of the front cross member.

* * * * *